May 7, 1935.  A. D. DOVJIKOV ET AL  2,000,693

SYSTEM IMPERVIOUS TO UNBALANCED FAULTS

Filed June 5, 1931  3 Sheets-Sheet 1

WITNESSES:

INVENTORS
Alexander D. Dovjikov,
Charles L. Fortescue &
Charles F. Wagner
BY
ATTORNEY

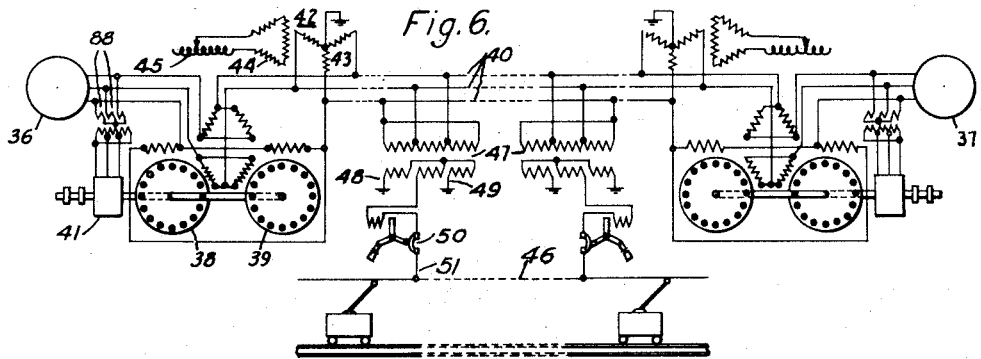
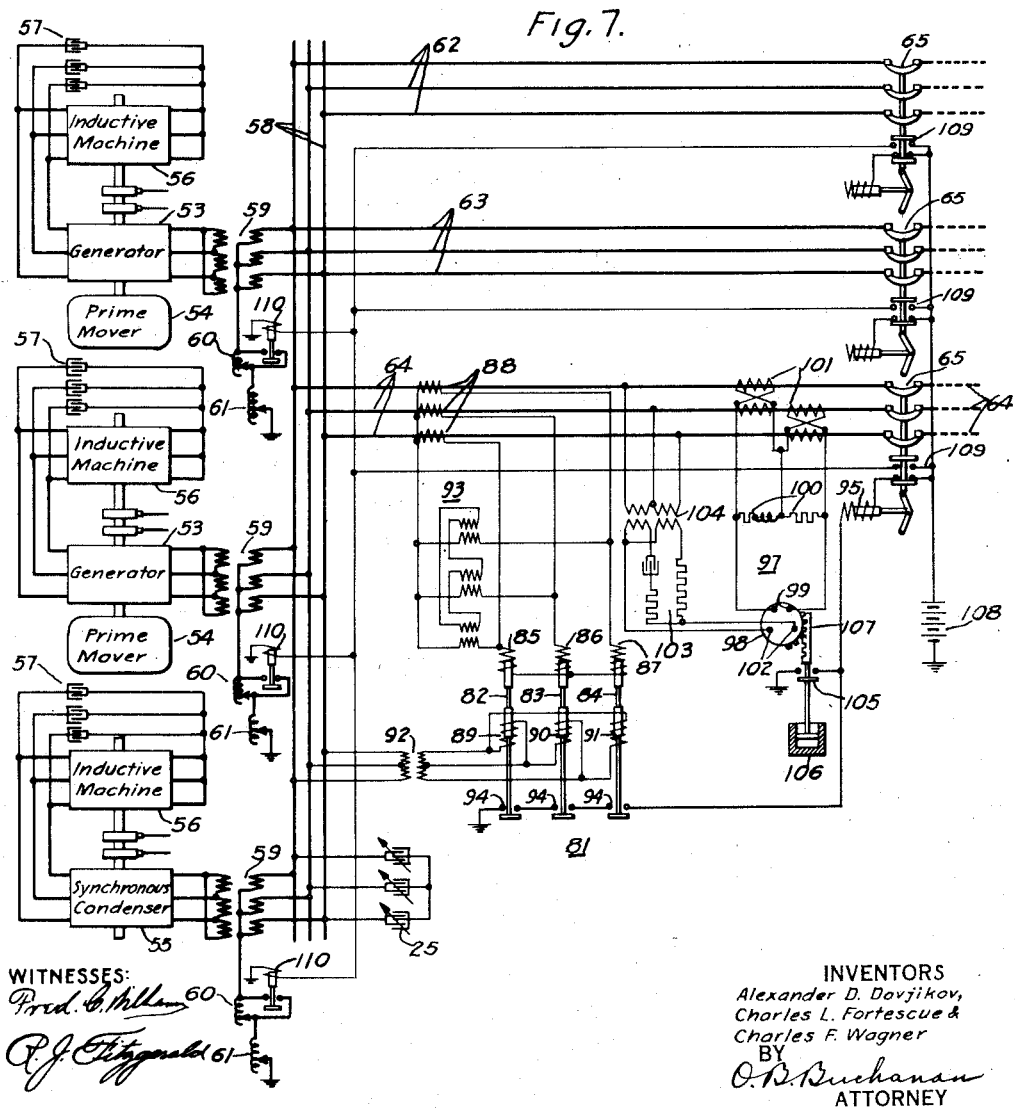

May 7, 1935.  A. D. DOVJIKOV ET AL  2,000,693
SYSTEM IMPERVIOUS TO UNBALANCED FAULTS
Filed June 5, 1931   3 Sheets-Sheet 3
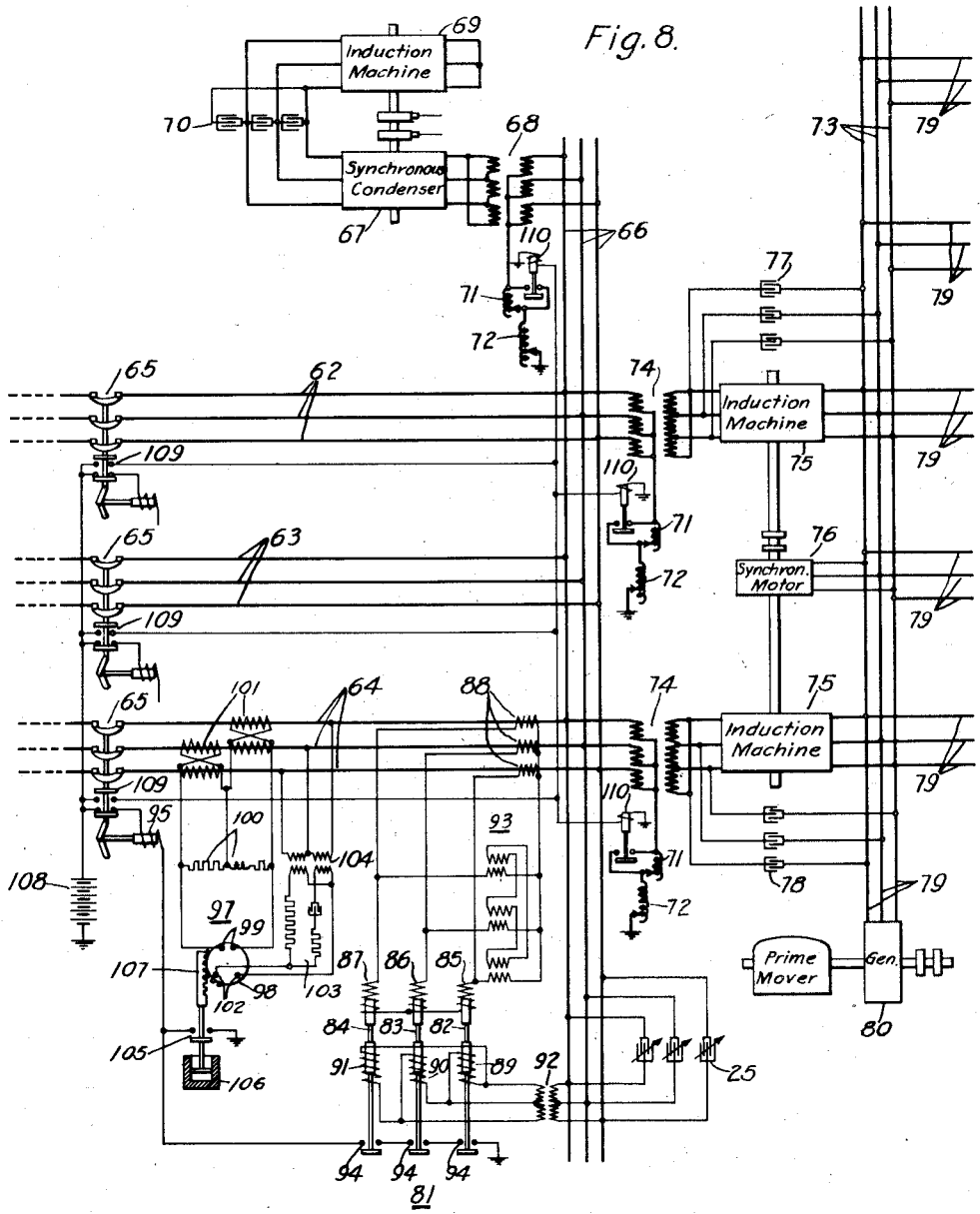
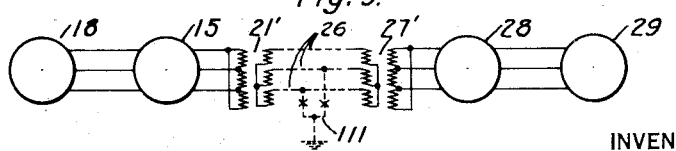
WITNESSES:
INVENTORS
Alexander D. Dovjikov,
Charles L. Fortescue &
Charles F. Wagner
BY
ATTORNEY Patented May 7, 1935

2,000,693

UNITED STATES PATENT OFFICE 2,000,693

SYSTEM IMPERVIOUS TO UNBALANCED FAULTS

Alexander D. Dovjikov, Wilkinsburg, Charles Le G. Fortescue, Pittsburgh, and Charles F. Wagner, Swissvale, Pa., assignors to Westinghouse Electric and Manufacturing Company, a corporation of Pennsylvania Application June 5, 1931, Serial No. 542,308

33 Claims. (Cl. 172—237)

Our invention relates to the prevention of the building-up of unwanted dynamic current in arcs following such unbalancing faults as single-phase faults to ground, phase-to-phase faults or short-circuits and double phase-to-ground faults on a three-phase transmission line. In other words, we prevent, or substantially prevent, the continuance of any kind of arc, following a fault on a transmission system, except for polyphase faults, but since three-phase faults nearly always start as a single or double fault which finally spreads to all of the line-conductors, we thus prevent three-phase faults by preventing the continuance of single or double phase faults.

With the foregoing and other objects in view, our invention consists in the perfection of means for blocking negative-phase-sequence currents as a means for preventing the dynamic follow arc in the event of certain faults on a balanced polyphase transmission system; the perfection of means whereby ground currents are blocked for the case of double faults to ground instead of for the case of single-phase faults to ground as heretofore; the utilization of both negative-phase-sequence blocking means and zero-phase sequence blocking means for the purpose of preventing follow arcs in any case except simultaneous faults on all three phases; the provision of improved relaying means particularly designed for our system; the provision of a novel means for interchanging single-phase power with a balanced polyphase system; and the provision for emergency operation with one or two conductors down.

Figure 1:
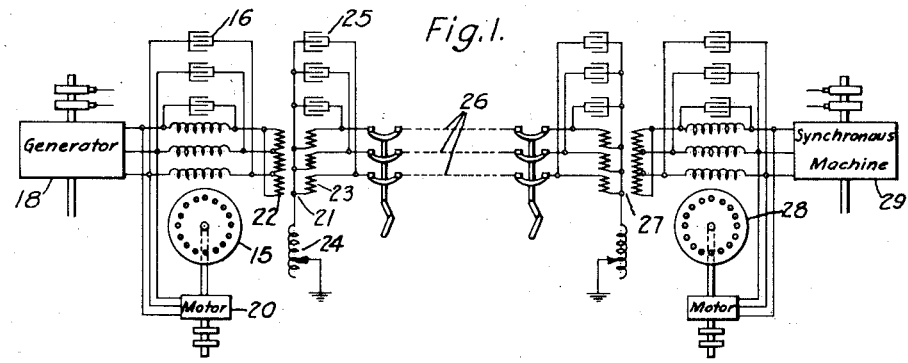
Figure 2A:
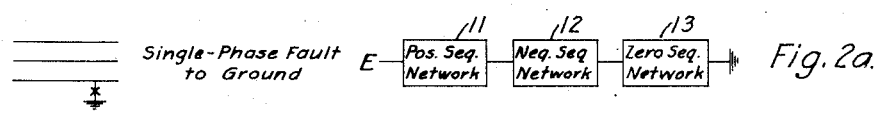
Figure 2B:
Figure 2C:
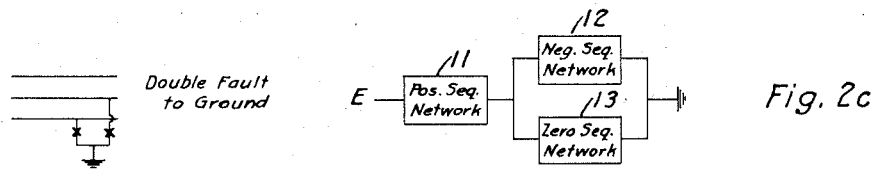
Figure 3:
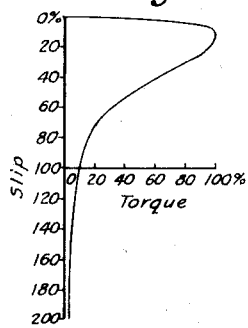
Figure 5:
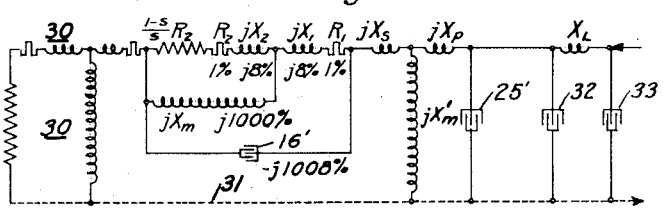
Figure 4:
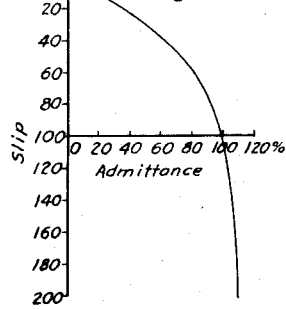

In the accompanying drawings,

Figure 1 is a diagrammatic view showing circuits and apparatus embodying our invention in a simplified system, Figs. 2a, 2b and 2c all show the equivalent phase-sequence diagrams for transmission lines with the three kinds of faults which our invention is designed to eliminate, Figs. 3 and 4 are speed-torque and speed-admittance diagrams of an induction machine such as we utilize for blocking the negative-sequence currents, Fig. 5 is an equivalent positive- or negative-sequence network of the sending end of the transmission system shown in Fig. 1, including the transmission line, but not including the receiving end thereof.

Fig. 6 is a diagrammatic view of circuits and apparatus showing a slightly modified form of embodiment of our invention, and illustrating how single-phase loads may be taken off of the transmission line without unbalancing the sending or receiving ends, Figs. 7 and 8 are diagrammatic views illustrative of the sending and receiving ends, respectively, of a large transmission system, with our novel relaying means indicated, and Fig. 9 is a diagrammatic view indicating our invention applied to a transmission system using ungrounded transmission lines.

Heretofore, grounding reactors have been utilized on grounded polyphase transmission systems, and tuned to the line-to-ground capacitive reactance of the system, for the purpose of preventing the zero-phase-sequence ground currents resulting from single-phase grounds from finding their way back to the transmission line, thereby limiting the ground-fault current to such a low value that the dynamic, or power-current, follow-arc, following, for example, a lightning discharge, will be unstable and extinguished within two or three cycles, or even four or five cycles. If the follow-arc current can be reduced to something of the order of 5 amperes, this purpose can be accomplished. Such grounding reactors have been known as Petersen coils, or various modifications or equivalents thereof, including the Bauch transformer which we have illustrated in our Fig. 6, as will be subsequently described. In the past, it has been the practice to effect the adjustment of such grounding reactors (which are always variable or adjustable) by making up a schedule for each transmission system, by placing single-phase ground faults, through high resistance, on the transmission lines under different conditions of system operation, adjusting the grounding reactor for minimum ground fault current in each instance. Thus a schedule has been obtained, informing the system operator as to the correct adjustment of the grounding reactors when there are 2 lines in service, or 3, or when the receiving-circuit conditions are thus and so, so that he can keep his grounding reactors adjusted for their best values, no matter what his operating conditions are. In general, whenever the network is so changed that the charging current of the system is changed, there should be a new setting or adjustment of the grounding reactors.

We have shown, in Figs. 2a, 2b and 2c, the equivalent phase-sequence network diagrams for the three kinds of faults for which our system is designed, these network diagrams being in accordance with the explanation and proof heretofore given in the articles by Messrs. C. F. Wagner and R. D. Evans, on "Symmetrical Coordinates", published in the Electric Journal, June and July, 1928; September and December, 1929; April and May, 1931.

For a single-phase fault to ground, as shown in Fig. 2a, the positive-sequence network 11, negative-sequence network 12 and zero-sequence network 13 are all present and all connected in series, so that the ground current could be blocked by making either the negative-sequence or the zero-sequence impedance infinite. The Petersen coil aims to make the zero-sequence impedance infinite. By our invention, we make the negative-sequence impedance infinite and we also make the zero-sequence impedance very large, because it is adjusted to be substantially infinite for double faults to ground.

For a phase-to-phase short circuit, which is represented in Fig. 2b, there are no ground currents, and hence the zero-sequence network 13 is omitted. It will be noted that the Petersen coil, making the zero-sequence impedance infinite, can have no effect in the event of phase-to-phase short-circuits. With the negative-sequence impedance infinite, in accordance with our invention, however, the fault currents are blocked, the same action as in the case of the single ground fault of Fig. 2a.

For the double fault to ground, as indicated in Fig. 2c, the negative-sequence network 12 is in parallel to the zero-sequence network 13, and these two are in series with the positive-sequence network 11. Thus, the ground fault-current cannot be reduced to zero by the Petersen coil, even assuming that it were nearly enough properly adjusted for double-ground conditions, because the negative-sequence network affords an alternate path for the fault current. According to our invention, we provide a system for which the equivalent negative-sequence network is a very large or substantially infinite impedance, and we also do the same thing for the zero-sequence network, thereby effectually blocking the flow of any material fault currents.

We propose to tune our grounding reactors by placing artificial double faults to ground for the purpose of adjusting the grounding reactors and making up a schedule, as previously explained, instead of utilizing artificial single-phase faults to ground as heretofore. Thus, whether the tuning of the grounding reactance is the same for double grounds as it is for single grounds, or whether it is different, we are assured that the tuning is at least right for double grounds, which is what we are after, because, by our system, the single grounds are taken care of by the infinite-negative-sequence impedance.

For our infinite, or very large, negative-sequence impedance, we may utilize any device which would effectively block the flow of negative-sequence current which appears in the system in case of any unbalanced fault. The preferred form which this instrumentality may take is a perfected form of what has heretofore been known as a series phase-balancer or phase-converter, which is an induction machine 15, preferably one which is especially designed to have as small resistances as possible and as small leakage reactances as possible, which means a small air gap. The stator winding of such a machine is in series relation to the stator winding of the generator, and the rotor is rotated, by some outside means, in a direction opposite to that in which it would naturally rotate when balanced load currents are passing through the stator. The speed-torque characteristics of such a machine, when the primary windings are traversed by normal full-load currents, are of the type shown in Fig. 3, which shows that the torque necessary to drive the machine backwards at synchronous speed with respect to the positive-sequence line-currents (200% slip) is very small, perhaps much smaller than indicated in Fig. 3. The general type of the speed-admittance curve of such a machine is indicated in Fig. 4, the significant point of which is that the admittance at zero slip, or at the synchronous speed, is small, being zero, but for the magnetizing current which can be compensated for, as will subsequently be pointed out, while, at 200% slip, the admittance is very large.

According to our invention, we compensate for this magnetizing current of the induction machine 15 by placing a suitably tuned capacitor 16 across the two terminals of each of the three primary phases of the machine, as indicated in Fig. 1, and as will be subsequently explained in connection with the equivalent circuit shown in Fig. 5.

As shown in Fig. 1, a simple system embodying our invention may comprise a synchronous generator 18, preferably having quick-response excitation in accordance with the patent to R. D. Evans et al., No. 1,692,495, granted November 20, 1928; a backwardly rotating induction machine 15, shunted by the capacitor 16 and driven by a small synchronous motor 20; a step-up transformer 21 having delta-connected low-voltage windings 22 and star-connected high-voltage windings 23, the latter being grounded through a grounding reactor 24, and being shunted by a capacitor bank 25, the purpose of which will be subsequently explained; a transmission line 26; a step-down transformer 27 similar to the transformer 21; a negative-sequence impedance 28 similar to the negative-sequence impedance 15; and a load circuit, symbolized by a synchronous machine 29, which is also preferably equipped with quick-response excitation.

The adjustment of the grounding reactor 24 has already been explained.

The capacitors 25, shunting the primary windings 23 of the transformer, are provided, where necessary, for the purpose of neutralizing the effect of the negative-phase-sequence magnetizing currents of the transformer, as will be more clear upon reference to the negative-phase-sequence network of the system, which is shown in Figure 5.

In Fig. 5, the equivalent capacitors, corresponding to the capacitor-banks 16 and 25, are indicated, for convenience, by the numerals 16' and 25', respectively. The equivalent circuit of the backwardly rotating induction machine, or series balancer, is given by a primary resistance $R_1$, a primary reactance $jX_1$, a secondary reactance $jX_2$, a secondary resistance $R_2$ and an impedance $$\frac{1-s}{s}R_2$$

(which may be either plus or minus, according to the direction of rotation), with a magnetizing-current reactance $jX_m$ shunted between the common terminal of the leakage reactances $jX_1$ and $jX_2$ and the outer terminal of the impedance $$\frac{1-s}{s}R_2$$

For convenience in visualizing the relative proportions, representative values have been assigned to the different equivalent impedances of the induction machine, the values given corresponding to a machine having a magnetizing current of 10% and a leakage reactance of 16%.

It will be noted that in Figs. 3 and 4, the zero-slip condition may be considered either for positive-sequence operation or for negative-sequence operation. In Fig. 5, the slip is supposed to be zero when the induction machine is rotating backwardly at synchronous speed. For this condition, it will be noted that the fraction $$\frac{1-s}{s}$$

is equal to infinity, indicating an open circuit. The capacitor 16', being connected across the entire series balancer, is then tuned to correspond to the reactance $j(X_1+X_m)$, as indicated by the numerical values suggested in Fig. 5.

A little consideration will show that the capacitor 16' does not block the positive-sequence current. The equivalent positive-sequence diagram for the induction machine 15 is the same as the negative-sequence diagram shown in Fig. 5, except that the slip is 200%, corresponding to $s=2$ in the fraction $$\frac{1-s}{s},$$

making this fraction equal to $-\frac{1}{2}$. Thus, the magnetizing reactance $jX_m$ is shunted by a very impedance $\frac{1}{2}R_2+jX_2$, so that practically all of the current goes through the low-impedance shunt. The capacitor 16' is not anywhere near tuned to this low-impedance shunt circuit, and hence there is no approach of anti-resonant conditions for the positive-sequence current.

The equivalent circuit of the generator 18 is indicated at 30, in Fig. 5, in a manner similar to the series balancer 15, just described. The outer terminals of the equivalent generator circuit are connected to the zero-potential bus 31 of the sequence-network.

The equivalent circuit of the step-up transformers 21 is indicated in Fig. 5 by the primary and secondary leakage reactances $jX_p$ and $jX_s$, shunted by the magnetizing reactance $jX'_m$.

The transmission line is represented, in Fig. 5, by a line-reactance $jX_L$ and two capacitors 32 and 33 which are shunted between the terminals of the line-reactance and the zero-potential bus 31 of the negative-sequence network.

Since it is necessary to reduce the fault current to as low a value as possible, at least as low as 5 amperes, it is usually desirable to give some attention to the return-path for the fault currents through the two line capacitors 32 and 33 and the two magnetizing-current reactances $jX'_m$ of the step-up and step-down transformers 21 and 27. The most advantageous conditions are when the sum of the magnetizing currents of the step-up and step-down transformers is equal to the charging current of the line. For a short line, this sum will, in general, be too small, in which case additional capacity must be connected across the treminals of the transformers, as indicated in Fig. 5, by the capacitor 25'. In this case, the joint effects of the capacitors 25' and 32 must resonate with the transformer reactance $j(X'_m+X_p)$. For long transmission lines, it is a common practice to neutralize most of the charging capacity by means of shunt-connected inductances, so that the joint effect of these inductances and the transformer reactance may readily be made equal to the capacitive reactance 32 of the equivalent sequence network of the line, similar to that shown in Fig. 5.

It will thus be seen that we very effectually block the flow of negative-sequence fault currents, the principal blocking being effected by the induction machines 15 and 28, serving as series phase-balancers. In this connection, it will be noted that when we speak of an induction machine as a series phase-balancer, we mean a machine having low leakage-reactance, low exciting current, low primary and secondary resistances, and no salient-pole effect or direct current-excitation. The effect of direct-current excitation would be, or could be adjusted, to neutralize the effective negative-sequence through-reactance of the machine, but this would be true of only one particular phase-position of the negative-sequence voltage. This would mean, that when an unbalanced fault occurred, its negative-sequence voltage would, in general, be different in phase from that of the series-balancer machine, so that a number of cycles, possibly even a second or more, would be required to bring the back-electro-motive force of the series-balancer into exact opposition to the negative-sequence voltage of the fault, and if the phase of this fault voltage should vary, as it probably would, on account of altering fault resistance, the blocking effect of the series-balancer would be very incomplete. By utilizing an unexcited induction machine as the phase-balancer we avoid all of these effects due to phase position of the negative-sequence voltage, and by utilizing the shunt capacitors 16, we can also neutralize the negative-sequence through-reactance of the phase balancer.

While it is preferable to drive the backwardly rotating induction machine at synchronous speed, by means of a synchronous motor 20, the action would be only slightly less perfect if it were driven at an induction-motor speed. Since, however, it is very important to reduce the fault current to as low a value as possible, the series-balancer will, in general, be driven by a synchronous motor.

The induction machine 15 and the capacitor 16 are either connected directly into the line or inductively connected through current transformers, preferably the former.

In case of a solid short-circuit from phase-to-phase, no current can flow through the short-circuit in a system which is supplied with infinite impedance to negative-sequence currents. The effect of the phase-balancers 15 and 28 must be to reduce the line voltage to zero in the faulted phase, thereby producing double line-voltage on the sound phase. The phase-balancers each develop terminal negative-sequence voltages which are equal to the normal positive-sequence voltages of the line.

The highest line voltages will appear in case of a two-phase fault to ground, in which case, the zero-sequence voltages developed by the tuned grounding reactance 24 will be equal to the normal line-to-neutral voltage in the sound phase, so that the positive, negative and zero-sequence voltages in this phase all add together to produce three times normal voltage to ground on the line, while the fault continues.

Considering the ability of the line insulation to withstand such abnormal voltages, we must remember that the number of insulators on 220 kv. lines is between 12 and 18. The number of insulators in the insulator strings is always chosen on some economical basis dependent upon the number of flash-overs which may be expected. In other words, if six insulators in the string will suffice to insulate the line, under wet conditions, it will be found, nevertheless, that insulation-failures or flash-overs will occur at the rate of so many per year. If the number of insulators in the string is increased from six to twelve, the number of flash-overs will be very much reduced, but some flash-overs will still occur. If the number of insulators in the string is still further increased, from twelve to eighteen, the number of flash-overs per year will be again reduced, but some flash-overs will still occur. It will be apparent, from these remarks, that there is a time-probability element in the behavior in the insulator strings, and that the number of insulators in the strings is chosen, not from the standpoint of the voltage which each string can withstand for a few minutes, but from the standpoint of the number of flash-overs which may be expected, per year, from a certain number of thousands of insulator-strings.

Considering the smallest number of insulators which would be considered for a 220 kv. line, we find that a string of 12 suspension Westinghouse porcelain insulators has a dry flash-over voltage of approximately 700 kv. and a wet flash-over voltage of approximately 400 kv., both at 60 cycles. A 200 kv. condenser bushing for the high-voltage winding of a 220 kv. transformer has a dry flash-over value of 665 kv. and a wet flash-over value of 600 kv. The line-to-neutral voltage of a 220 kv. line is $$\frac{200}{\sqrt{3}} kv.$$

so that the maximum voltage of three times the normal value would be $$220\sqrt{3} = 381 kv.$$

It will be seen that the line is well able to withstand this maximum voltage, even with the minimum value of the line insulators. In the vast majority of cases, this maximum voltage would endure only for a few cycles, or merely the time necessary to extinguish the arc, which means that the fault would normally clear itself, with our negative and zero-sequence blocking system, so that it would be unnecessary to take the faulted line out of service, even momentarily. The full positive-sequence power is being transmitted over the line, even during the two or four cycles necessary to extinguish the arc, so that there is no shock on the system and the line can be operated practically at its steady-state power limit, instead of having to be operated at a load which is little more than half of this value, in accordance with the previous practice. The line-insulation may be so designed as to permit emergency operation of the line, for longer periods of time, with one line down, or even with two lines down.

Very little, if any, increase in the insulation of the line transformers will be necessitated by our system, assuming that the adjustment of the infinite impedance of the zero and negative-sequence currents is carefully made and that the arc will be extinguished in a short time of the order of four or five cycles. According to the A. I. E. E. Standards (1925) for transformers, they must be built so as to be able to withstand a test on an alternating voltage of twice the rated voltage, plus 1000 volts. If the transformers have graded insulation, the same standards require them to receive a test voltage to ground, not less than 2.73 times the normal voltage, plus 1000 volts.

It will be observed that the line transformers 21 and 27 are so connected that they do not transmit any zero-sequence voltages to the low-voltage sides of the transformers, so that the maximum voltage appearing on any phase of the low voltage line will be only two times the normal line-to-ground voltage.

The induction machines must have a normal current rating equal to the current rating of the low-voltage line in which they are connected, and they must have a voltage rating, or voltage generated in the windings, equal to the normal voltage of the same line. In other words, the aggregate kva. capacity of the series-balancers at each end of the transmission line 26 must equal the normal kva. load rating of the same transmission line. The series-balancers must be able, however, to withstand a double phase-to-ground voltage for short periods of time, while the fault-arc is being interrupted.

If, for some reason, it is more advantageous to design the synchronous generator for double voltage to ground than the induction motor, the stator of the induction motor may be placed in the neutral of the synchronous generator, as indicated in Fig. 7, and in such case, the insulation to ground of the induction motor will correspond to the rated system voltage to ground.

It will be noted that the induction machines 15 or 28 of Fig. 1 may be designed for a speed which is the most economical speed from the standpoint of the electric design, rather than a speed which is determined by the mechanical requirements of the turbine, as in the case of the generator. The induction machine may be driven electrically by the synchronous motor 20, or it may be driven mechanically, either directly or through gearing, from the generator shaft, as is also indicated in Fig. 7.

The induction machines are designed so that their positive-sequence torques at their operating speed, or 200% slip, are as small as possible, so that the mechanical load on the motor 20, or other driving means, is very small.

The provision of our series-balancer machines entails practically a doubling of the dynamo-electric machine capacity which must be provided for the transmission system. This does not mean at all that the cost of the transmission system is doubled or even nearly doubled, as the principal cost of the transmission system is in the lines themselves. It has been pointed out that the utilization of infinite negative-sequence impedances, in transmission lines having negative zero-sequence currents, makes it possible to nearly double the useful load which can be carried by said lines, and not only that, but it would also produce a transmission system which would be practically immune to short circuits, which is of greater importance, probably, than the doubling of the usable capacity of the lines. There is an additional advantage, in such a transmission system, namely, that it will permit the taking of a considerable single-phase load, as for a single-phase railway, without unbalancing the three-phase systems which are connected to the respective ends of the transmission line. This is illustrated in Fig. 6, wherein the two large circles 36 and 37 at the extreme ends of the system represent substantially balanced three-phase power lines or networks having synchronous machines connected thereto and, in general, having both generators and load devices connected thereto. It is assumed that it is more economical to provide two induction machines 38 and 39, at each end of the transmission line 40, than a single-machine having a rating equal to that of the transmission line, and these two machines are connected in parallel to each other and in series to the line, their rotors being driven by a single synchronous motor 41.

In Fig. 6 the grounding means is illustrated, by way of example, as a Bauch transformer 42, consisting of a solidly grounded star-connected primary winding 43 and an open-delta secondary winding 44, the delta being closed by an adjustable grounding reactor 45 which performs the same function as the grounding reactor 24 in Fig. 1.

A single-phase railway system 46 is shown paralleling the transmission line 40 and connected thereto through a plurality of three-phase step-down transformers 47, two of the low-voltage terminals of which are short-circuited, as indicated at 48, 49. No short-circuit current will flow in the short-circuited phase of the step-down transformers and no unbalance in the trunk lines or systems 36 and 37 will occur, provided, of course, that care is taken to see that the same phases 48, 49 are short-circuited in each of the plurality of step-down transformers 47. The voltage of the unshorted phase of the transmission line 40 would increase, correspondingly to the reactances of the transformers 47, but the voltages of the three-phase systems 36 and 37 would not be increased, because the series phase balancers 38 and 39 would make the single-phase load on the step-down transformers 47 equivalent to a three-phase load on the three-phase systems. In view of the fact that the single-phase loads which are taken from the step-down transformers 47, are, in effect, three-phase loads on the three-phase systems, high-speed single-phase circuit-breakers 50 must be provided on the single-phase railway feeders 51, because a fault-to-ground on the trolley wire would correspond to a three-phase short-circuit on the whole transmission system, with a short-circuit current which is limited by the impedance of the step-down transformer 47.

In Figs. 7 and 8, we have illustrated the sending and receiving ends, respectively, of a large transmission system embodying our invention. It has been assumed that such a system comprises a plurality of generators 53, driven by prime movers 54, and one or more synchronous condensers 55 connected in parallel to the generators 53 for the purpose of relieving said generators of some or all of the reactive currents necessary to be supplied to the line. The synchronous generators and condensers 53 and 55 are protected by backwardly rotating serially connected induction machines 56 which are shunted by condenser banks 57 as previously described. The synchronous machines are connected to a high-voltage bus 58 through step-up transformers 59 which are similar to the step-up transformers 21 of Fig. 1, being equipped with grounding reactors, each of which is divided into two parts 60 and 61 as will be subsequently explained. We have not made any attempt to show the usual disconnecting switches and circuit breakers which would be provided for the purpose of cutting in and out various machines and transformers.

We have assumed, in Figs. 7 and 8, a multi-circuit transmission line comprising three parallel transmission-line circuits 62, 63 and 64, each of which is equipped with a sectionalizing circuit breaker 65 at each end.

At the receiving end of the transmission system, as shown in Fig. 8, another high-voltage bus 66 is provided. This bus 66 is assumed to have its voltage controlled by one or more synchronous condensers 67 connected thereto through a step-down transformer 68 similar to the step-down transformer 27 of Fig. 1, and protected by means of a backwardly rotating induction machine 69 which is connected in the neutral connections of the synchronous condenser 65. The terminals of the induction machine 69 are shunted by a condenser bank 70 which is delta-connected instead of being star-connected as in the previous figures, either connection being operative. The step-down transformer 68 of the synchronous condenser is also provided with a grounding reactor which is divided into two parts 71 and 72, as will be subsequently described.

In Fig. 8, it is further assumed that the receiving end of the transmission line is connected to a very large metropolitan power line or bus 73, which is a common condition for the receiving ends of transmission systems. This metropolitan high-voltage bus 73 will, in general, have a voltage lower than the voltage of the transmission line, so that step-down transformers 74 will be provided, similar to the step-down transformers 27 of Fig. 1, except that, in Fig. 8, the grounding reactors are divided into two parts 71 and 72. Interposed between the receiving bus 66 of the transmission line and the metropolitan bus 73 to which it is to be connected, are enough backwardly rotating induction machines 75 to have a total kva. capacity equal to the continuous load which is transferred between the two buses, said induction machines being driven by a synchronous motor 76, and being shunted by condenser banks 77 and 78 as previously explained.

The transmission network 73 is assumed to be connected to a large number of feeders 79, all of which have synchronous machines and other load devices connected thereto, and at least some having one or more synchronous generators 80 connected thereto.

In general, such a metropolitan system or network 73 will have a much higher aggregate kva. capacity of synchronous machines than the sending end of the transmission line which is shown in Fig. 7. The aggregate capacity of the induction machines 75 at the receiving end of the transmission line, however, is determined, not by the kva. capacity back of the metropolitan network, but by the kva. capacity which is normally fed into said network by the transmission system, which means that the aggregate capacity of induction machines 75 necessary to be installed is a reasonable figure which is quite feasible from an economic standpoint.

On the other hand, the kva. capacity of an induction machine, such as the machine 69, which is connected to a branch-circuit, so to speak, connected to the transmission system, has its kva. capacity determined by the normal kva. exchanged between said branch-circuit and said transmission system, and not by the total kva. rating of the entire transmission system. In general, each branch-circuit which is connected to a transmission system of our invention would have to be provided with such an induction machine 69, in order to realize the full advantage of our invention in snuffing out any arc which may be produced at a fault. If such a branch-circuit were not protected by an infinite negative-sequence impedance device, it would mean that a fault occurring anywhere on the system would have a fault-current which is determined by the capacity of the unprotected branch-circuit and not be the capacity of the sending and receiving ends of the transmission line.

In these days, since the introduction of the quick clearing of faults, as a means for maintaining system-stability, as explained in an application of R. D. Evans, et al, Serial No. 403,390, filed October 30, 1929, patented February 28, 1933, No. 1,899,613, and assigned to the Westinghouse Electric and Manufacturing Company, means would normally be provided for clearing a fault quickly. In our present system, however, no fault would need to be cleared quickly except a three-phase fault, which rarely occurs, except as an after-product of an unbalanced fault which hangs on long enough to communicate itself to the neighboring conductors. On the contrary, it would be harmful to clear an unbalanced fault, which occurs on our system, by means of a quick-acting relay which completes its energization of the tripping circuit of the circuit-breaker within two or three cycles, or before the arc at the fault can be snuffed out by our infinite impedance to negative and zero-sequence currents, because this would impose a switching operation, which it is one of the primary objects of our invention to avoid.

In Figs. 7 and 8, therefore, we show, by way of example, an instantaneous or quick-acting relaying means 81 which completes its response at least within two or three cycles and preferably much quicker than that, being responsive only to three-phase faults. This three-phase relaying means may be of any suitable design which is responsive only to three-phase faults. By way of example, we have illustrated three phase-to-phase impedance relays 82, 83 and 84 having current-responsive actuating windings 85, 86 and 87 which are connected in star across a star-connected current transformer 88; and having voltage-responsive restraining windings 89, 90 and 91 which are connected in delta across a small potential transformer 92 or its equivalent. Each of the current windings 85, 86 and 87 receives a current equal to the difference between two of the line currents. A return-path for the zero-sequence currents in the current transformers 88, in the event of a ground fault, is provided by means of any suitable grounding transformer bank 93 which permits the unimpeded flow of zero-sequence currents, while interposing a very high impedance to positive or negative-sequence currents.

The three impedance relays 82, 83 and 84 are provided with contacts 94 which are all connected in series, and thence to the tripping coil 95 of the associated circuit breaker 65, so that the circuit breaker is energized only upon the occurrence of a three-phase fault which causes all three of the impedance relays 82, 83 and 84 to pick up.

It will be understood that any suitable instantaneous directional relay, at least two types of which are available, may be utilized, to prevent the tripping of the circuit breaker, in response to the relays 82, 83 and 84, except when the power is flowing from the relaying station out into the line. Such directional relays include the galvanometer type of directional relay-element shown in an application of Shirley L. Goldsborough, Ser. No. 448,937, filed May 1, 1930, patented November 7, 1933, No. 1,934,662, and the balanced-beam type of directional relay-element shown in an application of Crichton and Graves, Ser. No. 437,924 filed March 20, 1930, patented July 17, 1934, No. 1,967,200, or in an application of Crichton, Graves and Feldman, Ser. No. 393,432, filed September 18, 1929, patented July 17, 1934, No. 1,966,439, all three of said applications being assigned to the Westinghouse Electric and Manufacturing Company.

In our system, we preferably provide other relaying means 97 which are responsive to unbalanced faults, but will respond only after a certain time-delay, which must be longer than four or five cycles, in order to give the arc at the fault time to clear itself if it is going to clear. The time of operation of this auxiliary relaying means 97 may be something of the order of a second or it may be much longer, as there is no particular hurry about clearing an unbalanced fault, because our high impedance to negative and zero-sequence currents will limit the fault currents to very small values anyway. Suitable signalling devices, such as lamps, (not shown) are practically always provided with relaying equipment and it is possible to utilize our auxiliary relaying means 97 merely for the purpose of making such an indication, in case the unbalanced fault should hang on, so that the station operator could at his leisure take means for clearing the fault and thus relieve the system from high voltage and from the more dangerous effect of a second fault on the sound phase or phases while the system is operating in this condition.

We prefer, however, to automatically trip out the faulty line-section in the event of a sustained unbalanced fault which refuses to clear itself, and to this end we have illustrated, purely by way of example, a negative-phase-sequence wattmeter relay 98 having current terminals 99 which are energized from a static negative-phase-sequence network 100 connected to current transformers 101 in the line to be protected; and having voltage terminals 102 which are energized from a negative-sequence static network 103 which receives its energy from potential transformers 104 connected to the line to be protected.

The negative-phase-sequence relay may be connected either to respond to the negative-phase-sequence real power, or to respond to the negative-phase-sequence reactive kva., or to respond to some combination of both. This may be effected by the proper choice of the phase relations between the single-phase current and voltage applied to the wattmeter element. In the following explanation, it will be assumed that the relay 98 responds to the negative-phase-sequence real power, but it will be understood that the other phase relations of current and voltage may also be utilized.

The two negative-phase-sequence networks 100 and 103 are so designed that they produce a current and a voltage which are in phase with each other when the negative-phase-sequence line-current and line-voltage are in phase with each other, the derived current and voltage being proportional to the corresponding negative-phase-sequence quantities of the line.

The wattmeter element 98 revolves in one direction when the negative-phase-sequence power-flow is in one direction and in the other direction when the negative-phase-sequence power-flow is reversed.

Considering an unbalanced fault as a source of negative-phase-sequence energy, it will be noted that the negative-phase-sequence wattmeter is designed to operate when this negative-phase-sequence power is flowing toward the end of the line in which the relay is connected, indicating that a fault is in the line being protected. Thus, the negative-sequence relay 98 will not operate for faults in other parallel lines, such as the lines 62 and 63, when we are considering a relay connected to the line 64.

The negative-phase-sequence wattmeter element 98 is connected, in any suitable manner, to a contact element 105, the closing of which is restrained by any suitable time-delay element which is symbolically represented by a dash-pot 106. By way of convenient illustration, the connection between the contact element 105 and the wattmeter element 98 is illustrated as a rack-and-segment connection 107.

The contact member 105 completes the circuit of the closing coil 95 of the circuit breaker 65. The tripping current for this circuit breaker is furnished by means of a battery 108.

While we have illustrated the auxiliary relaying means 97 as a means which responds only to faults other than three-phase faults, it will be apparent that it is not necessary to choose a type of auxiliary time-delay relaying equipment which will not respond in the event of a three-phase fault, because the three-phase faults will be cleared instantaneously by the relaying means 81 previously described.

In Figs. 7 and 8, we have indicated automatic means for resetting, or adjusting the setting of, the grounding reactors whenever one of the parallel transmission-line circuits is tripped out, thereby adjusting the grounding reactors to the altered line-to-ground capacity of the transmission system. This is accomplished by providing each of the circuit breakers 65 with auxiliary contacts 109 which are utilized for the purpose of energizing a plurality of relays 110 which thereupon short-circuit the smaller grounding reactor 60 in each of the grounding reactor circuits, so that the remaining reactances 61 are of a proper value for the reduced charging currents of the line with one circuit cut out.

As illustrative of the fact that our invention requires the zero-sequence fault currents to be negligibly small, regardless of how such smallness is obtained, we have illustrated our invention, in Fig. 9, as being applied to an ungrounded transmission system, in which the zero-sequence, or ground, currents are necessarily negligibly small, and in which, of course, no tuned grounding reactors would be utilized. The elements constituting our transmission system in Fig. 9 are given the same numbers as in Fig. 1 except that the numbers 21 and 27, indicating the line transformers, are primed, in order to indicate the alteration in the omission in the grounding connections. As indicated by dotted lines in Fig. 9, an unbalanced fault 111, on the ungrounded transmission line 26 therein shown, will be cleared by means of our infinite negative-sequence impedance-devices 15 and 28.

While we have explained the principles and theory of operation of our invention in accordance with our present understanding, and while we have illustrated several preferred forms of embodiment thereof, we do not wish to be limited to any particular principle or theory of operation or form of embodiment except as may be necessitated by the language of certain of our appended claims, particularly when read in the light of the foregoing specification and the prior art.

We claim as our invention:

1. In a three-phase electric power line, the combination, with said line, of series-balancer means for preventing the flow of negative-phase-sequence current in said line, and instantaneously operative means, responsive only to three-phase faults, for disconnecting a faulty line section.

2. In a three-phase electric power line, the combination, with said line, of series-balancer means for preventing the flow of negative-phase-sequence current in said line, and means for keeping substantially all zero-sequence currents out of said series-balancer means in the event of a fault on the system.

3. In a three-phase electric power line, the combination, with said line, of series-balancer means for preventing the flow of negative-phase-sequence current in said line, and neutral grounding reactors of such magnitude as to substantially resonate, in conjunction with the negative-sequence impedance of the system, with the effective zero-sequence condensive admittance of the system, so as to substantially block the flow of zero-sequence currents in a double phase-to-ground fault.

4. In a three-phase electric transmission system, the combination, with said system, of a three-phase transformer bank having a high-voltage winding and a magnetically coupled low-voltage winding, high- and low-voltage three-phase conductors connected thereto, respectively, said windings being so disposed and connected as not to transmit any zero-sequence current from said high-voltage conductors to said low-voltage conductors, a serially connected polyphase induction machine in series with said low-voltage conductors, means for rotating said series machine backwardly at synchronous speed, and capacitors connected in parallel across the terminals of the several phases of said series machine.

5. In a three-phase electric transmission system, the combination, with said system, of a three-phase transformer bank having a high-voltage winding and a magnetically coupled low-voltage winding, high- and low-voltage three-phase conductors connected thereto, respectively, said windings being so disposed and connected as not to transmit any zero-sequence current from said high-voltage conductors to said low-voltage conductors, a serially connected polyphase induction machine in series with said low-voltage conductors, means for rotating said series machine backwardly at synchronous speed, and capacitors connected in parallel across the terminals of the several phases of said series machine, and neutral grounding reactors of such magnitude as to substantially resonate, in conjunction with the negative-sequence impedance of the system, with the effective zero-sequence condensive admittance of the high-voltage conductors of said system, so as to substantially block the flow of zero-sequence currents on a double phase-to-ground fault on said high voltage conductors.

6. In a three-phase electric transmission system, the combination, with said system, of a three-phase transformer bank having a high-voltage winding and a magnetically coupled low-voltage winding, high- and low-voltage three-phase conductors connected thereto, respectively, said windings being so disposed and connected as not to transmit any zero-sequence current from said high-voltage conductors to said low-voltage conductors, a serially connected polyphase induction machine in series with said low-voltage conductors, means for rotating said series machine backwardly at synchronous speed, and capacitors connected in parallel across the terminals of the several phases of said series machine, said high-voltage transformer-winding being star-connected, and a neutral grounding reactor in the neutral connection of said high-voltage transformer-winding, said neutral grounding reactor being of such magnitude as to substantially resonate, in conjunction with negative-sequence impedance of the system, and the rest of the zero-sequence impedance of the high-voltage conductors of the system, with the effective zero-sequence admittance of the high-voltage conductors of the system, so as to substantially block the flow of zero-sequence currents in a double phase-to-ground fault on said high-voltage conductors.

7. In a three-phase electric power system including three-phase generator-means, a three-phase load-means having other three-phase generator-means connected thereto, and a three-phase connecting-means for connecting said first-mentioned generator-means to said load-means, the combination, with said connecting means, of a series-balancer means at each end for substantially blocking the flow of negative-sequence currents, each of said series-balancer means having a normal kva. rating substantially as great as the normal kva. loading of said connecting-means, and means for providing a tuned-reactance zero-sequence grounding circuit at each end of said connecting-means between said connecting-means and said series-balancer and generator-means, characterized by the fact that said tuned-reactance zero-sequence grounding circuits are tuned to give substantially minimum fault currents for double phase-to-ground faults on said connecting-means.

8. The invention as defined in claim 7, at least one of said series-balancer means being interposed between said connecting means and its associated power-translating means, as the case may be, and being insulated for double the normal voltage of the line in which it is serially connected, said connecting-means being insulated to withstand, for short periods of time, three times the normal line voltage thereof.

9. The invention as defined in claim 7, at least one of the generator-means being disposed between its associated series-balancer means and said connecting-means and being insulated for double its normal operating voltage, said connecting-means being insulated to withstand, for short periods of time, three times the normal line voltage thereof.

10. The invention as defined in claim 7, said connecting-means comprising circuit-interrupting means and relaying means for selectively controlling said circuit-interrupting means so as to clear a faulty line, characterized by the fact that said relaying means comprise instantaneously operative means responsive only to three-phase line-faults and delayed-action means responsive at least to any unbalanced faults for clearing a faulty line when the fault fails to clear itself within a small number of cycles.

11. In a polyphase electric power system, including polyphase lines of different voltages, the combination, with such a polyphase system, of a polyphase transformer-means for transferring power from a polyphase line of one voltage to a polyphase line of another voltage, and a polyphase capacitor-bank connected in parallel relation to one of said lines of dissimilar voltage and having such reactance, in conjunction with the effective capacitive admittance of said line, as to substantially neutralize the flow of negative-phase-sequence current in the magnetizing circuits of said transformer-means in the event of an unbalanced condition in the line to which said capacitor-bank is connected, and a serially connected polyphase induction machine in the other line to which said transformer-means is connected, means for rotating said series machine backwardly at synchronous speed, and capacitors connected in parallel across the terminals of the several phases of said series machine and having such reactance as to substantially minimize the flow of negative-phase-sequence currents through said series machine in the event of an unbalanced condition on the system on the line to which said capacitor-bank is connected.

12. In a polyphase electric power system, the combination, with such a polyphase line, of a serially connected polyphase induction machine, means for rotating said series machine backwardly at synchronous speed, and capacitors connected in parallel across the terminals of the several phases of said series machine.

13. In a polyphase electric power system, the combination, with such a polyphase line, of a serially connected polyphase induction machine, means for rotating said series machine backwardly at synchronous speed, and capacitors connected in parallel across the terminals of the several phases of said series machine, characterized by the fact that said capacitors are of such reactance as to substantially minimize the flow of negative-phase-sequence currents through said series machine in the event of an unbalanced condition on the system on one side of said series machine.

14. In a polyphase electric power system, including polyphase lines of different voltages, the combination, with such a polyphase system, of a polyphase transformer-means for transferring power from a polyphase line of one voltage to a polyphase line of another voltage, and a polyphase-capacitor-bank connected in parallel relation to one of said lines of dissimilar voltage and having such reactance, in conjunction with the effective capacitive admittance of said line, as to substantially neutralize the flow of negative-phase-sequence current in the magnetizing circuits of said transformer-means in the event of an unbalanced condition in the line to which said capacitor-bank is connected.

15. An electric transmission system comprising two substantially balanced three-phase systems, a single-phase system, connecting-means between said three-phase systems, and means for interchanging large blocks of power between said connecting-means and said single-phase system without unbalancing either of said three-phase systems, said power-interchanging means comprising a pair of series phase-balancer means connected in series with said connecting-means at spaced points, and a plurality of single-phase transformer-means at a plurality of points between the two series phase-balanced means, each of said single-phase transformer-means being connected between the same phase-conductor and the other two phase-conductors of said three-phase system.

16. An electric transmission system comprising two substantially balanced three-phase systems, a single-phase system, connecting-means between said three-phase systems, and means for interchanging large blocks of power between said connecting-means and said single-phase system without unbalancing either of said three-phase systems, said power-interchanging means comprising a pair of series phase-balancer means connected in series with said connecting means at spaced points, and a plurality of three-phase transformer-banks having high-voltage primary windings connected to said connecting-means, and having low-voltage secondary windings connected to said single-phase system, said low-voltage secondary windings having two phase-terminals short-circuited and connected to one of the terminals of said single-phase system, the same phases being short-circuited in each of said transformer-banks.

17. In a three-phase electric power system including three-phase generator-means, a three-phase load-means having other three-phase generator-means connected thereto, and a three-phase connecting-means for connecting said first-mentioned generator-means to said load-means, the combination, with said connecting-means, of a series-balancer means at each end for substantially blocking the flow of negative-sequence currents, each of said series-balancer means having a normal kva. rating substantially as great as the normal kva. loading of said connecting-means, a three-phase transformer bank at each end of said connecting-means, each transformer bank having a high-voltage winding and a magnetically coupled low-voltage winding, high- and low-voltage three-phase conductors connected thereto, respectively, said windings being so disposed and connected as not to transmit any zero-sequence current from said high-voltage conductors to said low-voltage conductors, the high-voltage windings being connected to said connecting-means and jointly having magnetizing currents which are approximately equal and opposite to the effective capacitive charging currents of said connecting-means, each of said high-voltage windings being star-connected, and a neutral grounding reactor in the neutral connection of each of said high-voltage transformer-windings, characterized by the fact that said neutral grounding reactors have such reactances as to give substantially minimum fault currents for double phase-to-ground faults on said connecting-means.

18. In a normally substantially balanced three-phase system including transmission lines operating, at times with only substantially balanced three-phase loads, the combination, with said lines, of means tending to prevent single-phase faults to ground in said transmission lines, comprising serially connected means for offering such high impedance to negative-sequence current as to reduce the fault current to a value which will not, in general, sustain an arc, while offering only slight impedance to the flow of positive-sequence current.

19. In a normally substantially balanced three-phase system including transmission lines operating, at times with only substantially balanced three-phase loads, the combination with said lines, of means tending to prevent phase-to-phase short-circuits in said transmission lines, comprising serially connected means for offering an approximately infinite impedance to negative-sequence current while offering only slight impedance to the flow of positive-sequence current.

20. In a normally substantially balanced three-phase system of such characteristics that the zero-sequence charging current is substantially zero, and including transmission lines operating, at times, with only substantially balanced three-phase loads, the combination, with said lines, of means tending to prevent double faults to ground in said transmission lines, comprising serially connected means for offering an approximately infinite impedance to negative-sequence current while offering only slight impedance to the flow of positive-sequence current.

21. In a normally substantially balanced three-phase system including ungrounded transmission lines in which the zero-sequence charging current is substantially zero, the combination, with said lines, of means tending to prevent double faults to ground in said transmission lines, comprising serially connected means for offering an approximately infinite impedance to negative-sequence current while offering only slight impedance to the flow of positive-sequence current.

22. In a normally substantially balanced three-phase system including grounded, long, high-voltage transmission lines, the combination, with said lines, of means tending to prevent double faults to ground in said transmission lines, comprising serially connected means for offering an approximately infinite impedance to negative-sequence current while offering only slight impedance to the flow of positive-sequence current and grounded-neutral transformer-means having a reactance adjusted to reduce the zero-sequence currents to substantially their minimum value for double faults to ground.

23. In a normally substantially balanced three-phase system including transmission lines designed to operate with only substantially balanced three-phase loads, the combination, with said lines, of means tending to prevent unbalanced faults in said transmission lines, comprising a serially connected three-phase induction machine, means for rotating said series machine backwardly at synchronous speed, and capacitors connected in parallel across the terminals of the several phases of said series machine, said capacitors being tuned so as to be substantially anti-resonant with the effective reactance of said series machine to negative-sequence currents under unbalanced fault conditions.

24. In a normally substantially balanced three-phase system including grounded, long, high-voltage transmission lines, the combination, with said lines, of means tending to prevent double faults to ground in said transmission lines, comprising a serially connected three-phase induction machine, means for rotating said series machine backwardly at synchronous speed, and capacitors connected in parallel across the terminals of the several phases of said series machine, said capacitors being tuned so as to be substantially anti-resonant with the effective reactance of said series machine to negative-sequence currents under unbalanced fault conditions, and grounded-neutral transformer-means having a reactance adjusted to reduce the zero-sequence currents to substantially their minimum value for double faults to ground.

25. The invention as specified in claim 24, characterized by the fact that the high-voltage transmission lines have, connected thereto, a plurality of polyphase transformer banks jointly having negative-sequence magnetizing currents approximately equal and opposite to the effective negative-sequence charging currents of said lines during unbalanced fault conditions.

26. In a normally substantially balanced three-phase system including grounded, long, high-voltage transmission lines, the combination, with said lines, of means for substantially preventing the flow of negative-sequence currents out on the transmission lines in the event of an unbalanced fault thereon, and grounding-reactor means for substantially resonantly blocking the return-flow of ground-fault current from ground back to the lines in the event of a double phase-to-ground fault.

27. In a normally substantially balanced three-phase system including grounded, long, high-voltage transmission lines, the combination, with said lines, of means for substantially preventing the flow of negative-sequence currents out on the transmission lines in the event of an unbalanced fault thereon, grounding-reactor means for substantially resonantly blocking the return-flow of ground-fault current from ground back to the lines in the event of a double phase-to-ground fault, line-sectionalizing current-interrupter means, a plurality of relays, each operatively associated with current-interrupter means, for responding only to three-phase line-faults within less than a time of the order of two or three cycles, and a plurality of relays, each operatively associated with current-interrupter means, for responding to at least all other faults but not until a delay of more than a time of the order of four or five cycles.

28. In a multi-circuit polyphase transmission system having grounding reactors adjusted to minimize the flow of ground currents in ground faults, and having means including circuit-interrupters associated with each circuit for clearing any fault which is not prevented by said grounding reactors, the combination, with said system, of means responsive to the interruption of one of the parallel circuits for automatically resetting said grounding reactors for the altered circuit conditions.

29. A three-phase electrical system comprising a transmission system feeding power into a larger power-line or network, through three-phase connecting-means interposed therebetween at the receiver end of the transmission system, characterized by a backwardly rotating dynamo-electric means for interposing a very high impedance to negative-phase-sequence currents interposed in series circuit relation to said connecting-means and having a kva. capacity commensurate with the kva. capacity normally transmitted through said connecting-means from said transmission system.

30. In a three-phase electric power line, the combination, with said line, of series-balancer means for substantially preventing the flow of negative-phase-sequence current in the line, circuit-interrupting means and relaying means for selectively controlling said circuit-interrupting means so as to clear a faulty line, characterized by the fact that said relaying means comprise an instantaneously operative relay-means responsive only to three-phase faults on a power line, and a relay-means operative in response to line faults only after a few cycles, but within about a second.

31. In a three-phase electric power line, the combination, with said line, of series-balancer means for substantially preventing the flow of negative-phase-sequence current in the line, circuit-interrupting means and relaying means for selectively controlling said circuit-interrupting means so as to clear a faulty line, characterized by the fact that said relaying means comprise an instantaneously operative relay-means responsive only to three-phase faults on a power line, and a relay-means selectively responsive exclusively to negative-phase-sequence conditions and operative in response to line faults only after a few cycles, but within about a second.

32. In a three-phase electric power line, the combination, with said line, of series-balancer means for substantially preventing the flow of negative-phase-sequence current in the line, circuit-interrupting means and relaying means for selectively controlling said circuit-interrupting means so as to clear a faulty line, characterized by the fact that said relaying means comprise a relay element of the wattmeter type having the property of turning in one direction when the power-flow is in one direction and in the other direction when the power-flow is reversed, said relay having a voltage winding, a current winding, stationary and moving contact elements, means responsive to a relative movement of said contact elements for tripping a circuit-interrupting means, a time-delay means for causing said contacts to move slowly at a speed proportional to the degree of energization of said wattmeter elements, said speed being sufficiently slow to secure selectivity by time discriminations, and means for energizing said voltage and current windings in response only to the negative-phase-sequence voltage and current, respectively, of the line-section to be protected.

33. The invention as defined in claim 32, characterized by said negative-phase-sequence energizing means developing a single-phase voltage and a single-phase current which are in phase with each other when the negative-phase-sequence line-current and the negative-phase-sequence line-voltage are in phase with each other.

ALEXANDER D. DOVJIKOV.
CHARLES LE G. FORTESCUE.
CHARLES F. WAGNER.